United States Patent
Kawanishi et al.

(10) Patent No.: US 7,962,039 B2
(45) Date of Patent: Jun. 14, 2011

(54) MULTIPLE WAVELENGTH LIGHT SOURCE, AND GENERATION METHOD FOR MULTIPLE WAVELENGTH LIGHT

(75) Inventors: Tetsuya Kawanishi, Tokyo (JP); Masayuki Izutsu, Tokyo (JP)

(73) Assignee: National Institute of Information and Communications Technology, Incorporated Administrative Agency, Tokyo (JP)

( * ) Notice: Subject to any disclaimer, the term of this patent is extended or adjusted under 35 U.S.C. 154(b) by 833 days.

(21) Appl. No.: 11/571,282

(22) PCT Filed: Jun. 29, 2005

(86) PCT No.: PCT/JP2005/012430
§ 371 (c)(1),
(2), (4) Date: Jan. 3, 2008

(87) PCT Pub. No.: WO2006/004133
PCT Pub. Date: Jan. 12, 2006

(65) Prior Publication Data
US 2009/0310968 A1   Dec. 17, 2009

(30) Foreign Application Priority Data
Jun. 30, 2004   (JP) ................................ 2004-192377

(51) Int. Cl.
*H04B 10/02* (2006.01)
*H04B 10/04* (2006.01)
*H04J 14/02* (2006.01)

(52) U.S. Cl. ............. 398/94; 398/82; 398/160; 398/183

(58) Field of Classification Search .................... 398/79, 398/80, 82, 85, 94, 141, 146–150, 160, 183, 398/187, 197, 198, 200, 201
See application file for complete search history.

(56) References Cited

U.S. PATENT DOCUMENTS
5,265,112 A   11/1993   Noll et al.
(Continued)

FOREIGN PATENT DOCUMENTS
EP   0385697 A1   9/1990
(Continued)

OTHER PUBLICATIONS

Translation of International Preliminary Report on Patentability mailed Mar. 1, 2007 of International Application No. PCT/JP2005/012430.

(Continued)

*Primary Examiner* — Dalzid Singh
(74) *Attorney, Agent, or Firm* — Westerman, Hattori, Daniels & Adrian, LLP

(57) ABSTRACT

It is an object of the present invention to provide a multiple wavelength light source capable of generating lights of more wavelengths, and a generation method for multiple wavelength light using a multiple wavelength light source.
A multiple wavelength light source of the present invention is a multiple wavelength light source having an optical comb generator for obtaining an input light and a group of lights shifted from the input light by predetermined frequencies; and an optical adjusting portion adjusting lights to be inputted to the optical comb generator; wherein the optical comb generator is composed of an optical fiber loop (105) which is provided with an optical SSB modulator (101), an optical amplifier (102) for compensating a conversion loss at the optical SSB modulator, an optical input port (103) for inputting lights from the light source, and an optical output port (104) for outputting lights, and the optical adjusting portion obtains a plurality of lights having different wavelengths.

8 Claims, 4 Drawing Sheets

U.S. PATENT DOCUMENTS

2002/0012495 A1* 1/2002 Sasai et al. .................. 385/24
2002/0015212 A1   2/2002 Fujiwara
2002/0090164 A1   7/2002 Endo
2003/0190119 A1* 10/2003 Kawanishi et al. ............ 385/27

FOREIGN PATENT DOCUMENTS

EP    1209780 A2    5/2002
JP    2002-162659 A  6/2002

OTHER PUBLICATIONS

Supplementary European Search Report with a date of completion of search of Aug. 28, 2007, issued in corresponding European Patent Application No. 05758114.

Endo, M. et al.; "Investigation of single sideband optical frequency comb generations using a dual-electrode Mach-Zehnder modulator in a fiber recirculating loop"; Laser and Electro-Optics, 1999. The Pacific Rim Conference on Seoul, vol. 3, pp. 771-772, Aug. 30, 1999.
European Office Action dated May 27, 2008, issued in corresponding Japanese Patent Application No. 05758114.2.
Endo et al. "Investigation of single sideband optical frequency comb generations using a dual-electrode Mach-Zehnder modulator in a fiber recirculating loop"; Laser and Electro-Optics; ThS6/CLEO/Pacific Rim '99; pp. 771-772, 1999.
Search Report EP 05 75 8114 of corresponding European Application dated Sep. 6, 2007.
International Search Report of PCT/JP2005/012430, date of mailing: Oct. 25, 2005.

* cited by examiner

MULTIPLE WAVELENGTH LIGHT SOURCE, AND GENERATION METHOD FOR MULTIPLE WAVELENGTH LIGHT

TECHNICAL FIELD

The present invention relates to a multiple wavelength light source and a generation method for multiple wavelength light.

BACKGROUND ART

A multiple wavelength light source can be used as a light source for a wavelength multiplexed communication system, a reference light source for measurement, and the like. Therefore, various types of multiple wavelength light sources have been proposed. As specific multiple wavelength light sources, one having integrated numerous semiconductor lasers (LD), a super continuum light source utilizing non-linearity of a fiber, a mode-locked laser using a fiber ring, and an optical comb generator using a Fabry-Perot optical modulator are known.

For the mode-locked laser and the Fabry-Perot optical modulator, phase relationships between wavelength contents are determined, and wavelength intervals are accurately constant. However, a multiple wavelength light source using them is required to stabilize an optical path, so that the apparatus becomes complicated. Also, since the super continuum light source uses the mode-locked laser, there is a similar problem as that of the mode-locked laser.

In case an optical comb generator is used as the multiple wavelength light source, phase relationships between wavelength components need not be determined. Accordingly, an optical comb generator using an optical SSB modulator instead of a Fabry-Perot optical modulator has been developed. (see [T. Kawanishi, S. Oikawa, K. Higuma and M. Izutsu, "Electraically Tunable Delay Line Using an Optical Single-Side-Band Modulator" *IEEE Photon. Tech. Lett.*, Vol. 14, No. 10, 1454-1456 (2002)], [Tetsuya Kawanishi, Masayuki Izutsu, "Optical Comb Generation Using a SSB Modulation Optical Loop And Variable Optical Delay Line" Shingaku Giho (Technical Report of IEICE) 2004-04, pp. 13-18 (2004)]).

FIG. 4 shows a basic arrangement of a conventional optical comb generator using an optical SSB modulator (hereinafter, also called simply as "optical comb generator"). As shown in FIG. 4, an optical comb generator (100) is composed of an optical fiber loop (105) provided with an optical SSB modulator (101), an optical amplifier (102) for compensating a conversion loss by the optical SSB modulator, an optical input port (103), and an optical output port (104). It is to be noted that the optical SSB modulator is an optical modulator capable of obtaining an output light having shifted just an amount of a frequency of a modulating signal. Hereinafter, a basic operation of the optical comb generator will be described.

An input light (106) is inputted to the input port (104) of the optical comb generator. The input light is a continuous light ($f_0$) of a single mode. Then, a frequency of the input light is shifted ($f_0+f_m$) by the optical SSB modulator (101). A light component (107) whose frequency has been shifted, circles the loop to be combined with a new light inputted to the input port ($f_0$, $f_0+f_m$). These lights are guided to the optical SSB modulator (101), and frequencies of both components are shifted ($f_0+f_m$, $f_0+2f_m$). By repeating these processes, lights having numerous spectrum components (an optical comb) can be obtained. While phase relationships between wavelength components are unstable, since wavelength intervals are constant with a good accuracy and there is little necessity to stably control an optical path, the optical comb generator has an advantage that a simple apparatus is adequate.

Thus, with an optical comb generator, a plurality of wavelength components is included in a loop. Therefore, in order to prevent a light interference within the loop, a single light has been used as the input light.

A plurality of lights having different wavelengths (frequencies) is required in order to test a device for a wavelength multiplexed optical communication system. However, in order to obtain a plurality of lights having different wavelengths, the apparatus becomes complicated and the cost becomes high.

From such a perspective, various devices for testing a device for a wavelength multiplexed optical communication system have been invented. For example, as shown in FIG. 2 of [L. D. Garrett, A. H. Gnauck, Member, IEEE, F. Forghieri, V. Gusmeroli, and D. Scarano, "16×10 Gb/s WDM Transmission Over 840-km SMF Using Eleven Broad-Band Chirped Fiber Gratings", IEEE PHOTONICS TECHNOLOGY LETTERS, VOL. 11, NO. 4, April 1999], after having bundled a plurality of wavelength components, an intensity modulation is collectively performed by one modulator, thereby performing an experiment related to the wavelength multiplexed system using such a light. In this example, since the same modulation is ultimately applied to all of the wavelength components, it cannot be deemed that a test is performed appropriately.

Also, in FIG. 1 of [Hiro Suzuki, Jun-Ichi Kani, Hiroji Masuda, Noboru Takachio, Katsumi Iwatsuki, Yasuhiko Tada, and Masatoyo Sumida, "1-Tb/s (100 10 Gb/s) Super-Dense WDM Transmission with 25-GHz Channel Spacing in the Zero-Dispersion Region Employing Distributed Raman Amplification Technology" IEEE PHOTONICS TECHNOLOGY LETTERS, VOL. 12, NO. 7, July 2000], after having bundled even numbers and odd numbers of wavelength components, intensities are modulated by using signals having time differences, thereby performing an experiment related to the wavelength multiplexed system using such light. Also in this example, while modulation patterns are different between adjacent cannels, the same patterns appear after every other channel. Therefore, as in the above example, it cannot be deemed that a test is performed appropriately. Therefore, a multiple wavelength signal source including more modulations with a simple apparatus have been desired.

DISCLOSURE OF THE INVENTION

It is an object of the present invention to provide a multiple wavelength light source capable of generating lights having more properties by using the above-mentioned conventional optical comb generator, and a generation method for multiple wavelength light using such a light source.

It is another object of the present invention to provide a multiple wavelength light source capable of providing a plurality of lights having different wavelengths (frequencies) with a simple apparatus. It is another object of the present invention to provide a multiple wavelength light source used specifically for testing an optical communication device such as a device for a wavelength multiplexed optical communication system.

The inventors of the present invention have reached completion of the present invention based on knowledge that a light interference within an optical comb generator can be suppressed when a predetermined optical comb generator is used, and a predetermined multiple wavelength light source is used as a light source. Namely, the above-mentioned problems can be solved by the following inventions:

[1] In order to achieve at lease one of the above-mentioned objects, a multiple wavelength light source of the present invention is a multiple wavelength light source having an optical comb generator for obtaining an input light and a group of lights shifted from the input light by predetermined frequencies; and an optical adjusting portion adjusting lights to be inputted to the optical comb generator; wherein the optical comb generator is composed of an optical fiber loop (105) which is provided with: an optical SSB modulator (101), an optical amplifier (102), an optical input port (103) for inputting lights from the light source, and an optical output port (104) for outputting lights, and the optical adjusting portion obtains a plurality of lights having different wavelengths.

Only a single light has been inputted to the conventional optical comb generator. It has been considered that when a plurality of lights is inputted, the lights interfere complicatedly, so that a desirable output light cannot be obtained. However, with a predetermined optical comb generator as in the present invention, it has been found that even if a plurality of lights having different wavelengths are inputted, the lights do not interfere with one another. For example, if n types of lights are inputted, n times as many number of outputs as that of the conventional optical comb generator can be obtained. Namely, according to the present invention, a lot of lights having different optical frequencies can be obtained compared to a multiple wavelength light source using the conventional optical comb generator. Since a lot of lights having different wavelengths can be thus obtained, the multiple wavelength light source of the present invention can be used preferably for testing a device for a wavelength multiplexed optical communication system and the like. Also, since the present invention can obtain several times as many lights compared to the conventional optical comb generator by only preparing a small number of multiple wavelength light sources, the present invention can provide a light source for testing a device for a wavelength multiplexed optical communication system at a low cost. Specifically, when differences between a plurality of lights adjusted by the optical adjusting portion are equal to or more than several times as much compared to a modulating frequency of the optical SSB, it is preferable since the optical combs derived from the respective input lights do not overlap.

[2] A preferred embodiment of the multiple wavelength light source of the present invention is the multiple wavelength light source described in the above [1], wherein the optical adjusting portion is composed of a plurality of light sources generating a plurality of lights having different wavelengths. When a plurality of light sources is thus used, a plurality of lights having different wavelengths can be easily obtained.

[3] A preferred embodiment of the multiple wavelength light source of the present invention is the multiple wavelength light source described in the above [1], wherein the optical adjusting portion is provided with a light source outputting optical signals arranged with periodicity or pseudorandom signals. By using these light sources that output optical signals, a multiple wavelength light source capable of outputting a multiple wavelength light having various kinds of information as an output light can be obtained.

[4] A preferred embodiment of the multiple wavelength light source of the present invention is the multiple wavelength light source described in the above [1], wherein the optical adjusting portion is provided with a phase modulator, an intensity modulator, or a frequency modulator respectively performing a phase modulation, an intensity modulation, or a frequency modulation per wavelength for a light inputted to the optical comb generator. By thus modulating the input light itself, a situation where output spectrums are varied by interferences between wavelength components can be prevented. A frequency component of the modulating signal may be any frequency component as long as it is higher than frequency components of a machine vibration of the optical fiber loop and a temperature change. For example, interference effects can be averaged by a signal composed of frequency components between 10 Hz and 1 MHz inclusive and between 300 Hz and 10 kHz inclusive. This will enable suppressing interferences within the loop to obtain a sharp output light. Also, with the multiple wavelength light source of this embodiment, the output lights thereof may have different kinds of information per wavelength, so that the output lights can be effectively utilized as detection lights of a device for a wavelength multiplexed optical communication system.

[5] Another preferred embodiment of the multiple wavelength light source of the present invention is the multiple wavelength light source described in the above [1], wherein values of frequencies modulated by the optical SSB modulator are 1 GHz-50 GHz. It is to be noted that modulating frequencies may be changed every time the input light circles. Thus, an optical comb having different frequency intervals can be obtained.

[6] Another preferred embodiment of the multiple wavelength light source of the present invention is a wavelength multiplexed optical communication system using the multiple wavelength light source described in the above [1].

[7] In order to achieve at lease one of the above-mentioned objects, a generation method for a multiple wavelength light is a generation method for a multiple wavelength light obtaining an optical comb that is a collection of lights whose optical frequencies are sequentially shifted by repeating: a step of an optical adjusting portion adjusting a plurality of lights having different wavelengths; a step of a plurality of lights entering an optical input port (103); a step of the plurality of lights entering an optical SSB modulator (101) through an optical fiber loop (105); a step of the optical SSB modulator outputting an optical single sideband signal having shifted a frequency of the input light by a frequency of a modulating signal; a step of the optical amplifier (102) increasing an optical intensity of the output lights of the optical SSB modulator (101); a step of output lights from the optical amplifier (102) reaching the optical input port (103) through the optical fiber loop (105); and a step of the output lights from the optical amplifier (102) and a light from the optical adjusting portion being combined at the optical input port (103).

[8] A preferred embodiment of the generation method for a multiple wavelength light is a wavelength multiplexed optical communication method using a multiple wavelength light obtained by the method for generating the multiple wavelength light as described in the above [7].

According to the present invention, it is made possible to provide a multiple wavelength light source having types of light n-times ("n" is number of types of inputted lights) as much as that of the conventional optical comb generator. This multiple light source can be utilized as a light source of a wavelength multiplexed optical communication system, a light source for testing a device for a wavelength multiplexed optical communication, and the like.

According to the present invention, it is made possible to provide a multiple wavelength light source capable of providing a plurality of lights having different wavelengths (frequencies) with a simple apparatus. Also, according to the present invention, an optical comb (multiple wavelength light) can be formed by modulating per light component composing the optical comb. Also, since lights having various kinds of information can be formed compared to the conventional multiple wavelength light source, the present invention can be used preferably for testing a device used for an optical communication such as a wavelength multiplexed system.

BRIEF DESCRIPTION OF THE DRAWINGS

FIG. 2 is a schematic diagram showing a state of light in each process.

BEST MODE OF CARRYING OUT THE INVENTION

1. Specific Example of Multiple Wavelength Light Source

Figure 1:
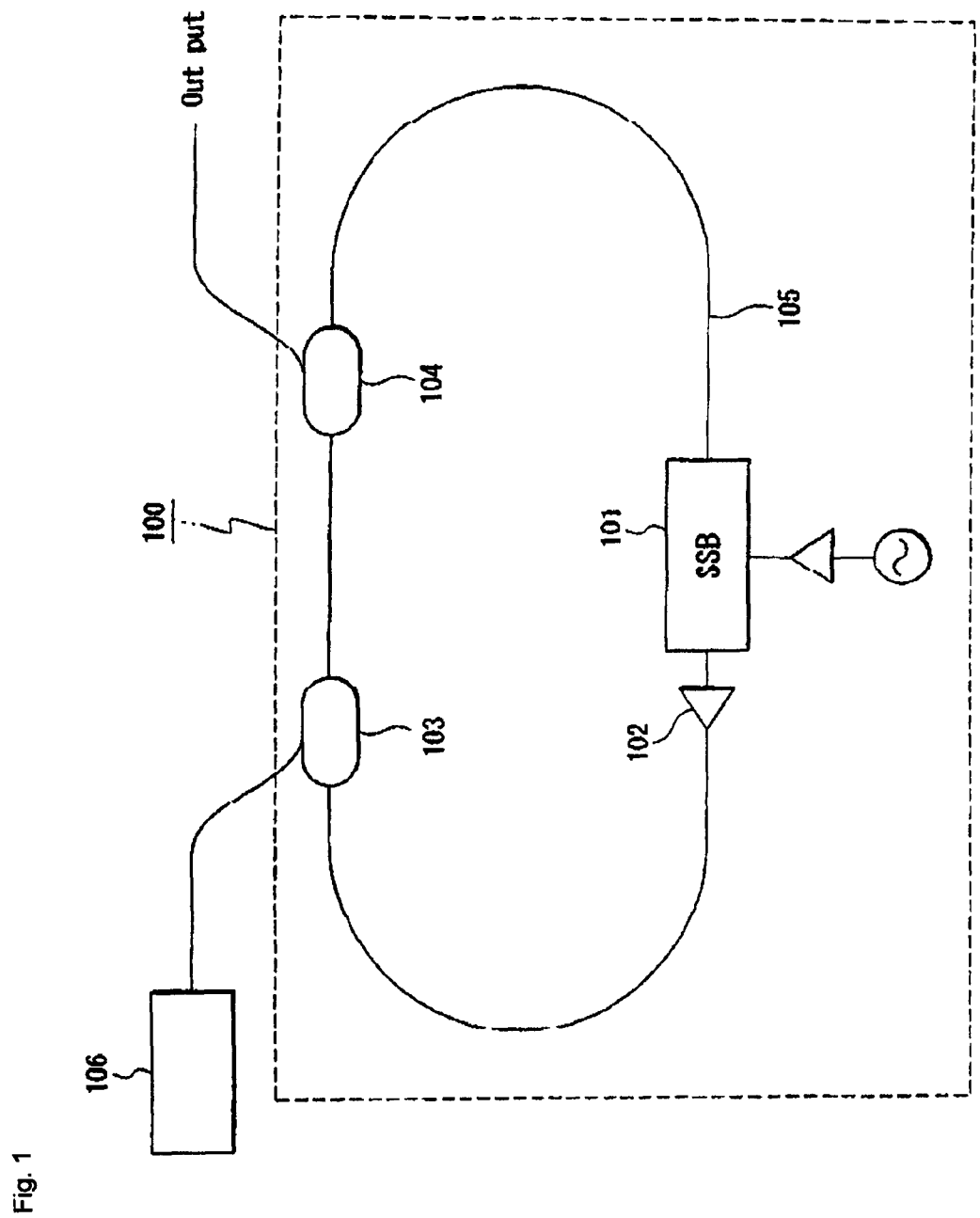
FIG. 1 is a schematic diagram showing a basic arrangement of a multiple wavelength light source of the present invention.

FIG. 1 is a schematic diagram showing a basic arrangement of a multiple wavelength light source of the present invention. As shown in FIG. 1, the multiple wavelength light source of the present invention is provided with an optical comb generator (100) and an optical adjusting portion (106). Hereinafter, components of the multiple wavelength light source of the present invention will be described.

(1.1. Optical Comb Generator)

The optical comb generator (100) is an apparatus for obtaining an input light and a group of lights shifted from the input light by predetermined frequencies. As shown in FIG. 1, the above-mentioned optical comb generator of the present invention is provided with an optical SSB modulator (101), an optical amplifier (102), an optical input port (103), and an optical output port (104). It is to be noted that the operation of the optical comb generator is the same as that described in the prior art.

(1.1.1. Optical SSB Modulator)

An optical SSB modulator is an optical modulator which can obtain an output light having shifted for a frequency of a modulating signal ($f_m$) (see [S. Shimotsu, S. Oikawa, T. Saitou, N. Mitsugi, K. Kubodera, T. Kawanishi and M. Izutsu, "Single Side-Band Modulation Performance of a LiNbO3 Integrated Modulator Consisting of Four-Phase Modulator Waveguide," IEEE Photon. Tech. Lett., Vol. 13, 364-366 (2001)] and [Shimotsu Shinichi, Masayuki Izutsu, "LiNbO3 optical single-sideband modulator for next-generation communication", Optical Alliance, 2000.7. pp. 27-30]). It is to be noted that the operation of the optical SSB modulator is reported in detail in [Tetsuya Kawanishi, Masayuki Izutsu, "Optical frequency shifter using optical SSB modulator", TECHNICAL REPORT OF IEICE, OCS2002-49, PS2002-33, OFT2002-30 (2002-08)], [Higuma et al., "X-cut lithium niobium optical SSB modulator", Electron Letter, vol. 37, 515-516 (2001)], and the like.

As values of frequencies to be modulated by the optical SSB modulator, 1 GHz-50 GHz can be mentioned, while specifically, 10 GHz, 12.5 GHz, and 25GHz can be mentioned. It is to be noted that modulating frequencies may be changed every time the input light circles. Thus, an optical comb having different frequency intervals can be obtained.

(1.1.2. Optical Amplifier)

The optical amplifier (102) is an apparatus for compensating a conversion loss by the optical SSB modulator. A publicly known optical amplifier may be used as the optical amplifier. It is preferable that a light attenuated by the optical SSB modulator is restored to its original intensity. Also, the optical amplifier may be installed to increase a light intensity before entry into the optical SSB modulator.

(1.1.3. Optical Input Port/Optical Output Port)

The optical input port (103) is a port for the light from the light source to enter. On the other hand, the optical output port (104) is a port for outputting a light. Publicly known optical ports may be used as the optical input port and the optical output port. Specifically, a publicly known circulator can be used.

(1.2. Optical Adjusting Portion)

The optical adjusting portion is an apparatus for obtaining a plurality of lights having different wavelengths. An optical adjusting portion provided with a plurality of light sources that generate a plurality of lights having different wavelengths is a preferred embodiment of the present invention. By thus using a plurality of light sources, a plurality of lights having different wavelengths can be easily obtained. Also, the optical adjusting portion provided with a phase modulator, an intensity modulator, or a frequency modulator respectively performing a phase modulation, an intensity modulation, or a frequency modulation (preferably per wavelength) for a light inputted to the optical comb generator is preferable. By thus modulating the input light itself, a situation where output spectrums are varied by interferences between wavelength components can be prevented, and in addition, information can be superimposed per wavelength. A frequency component of the modulating signal may be any frequency component as long as it is higher than frequency components of a machine vibration of the optical fiber loop and a temperature change. For example, interference effects can be averaged by a signal composed of frequency components between 10 Hz and 1 MHz inclusive and between 300 Hz and 10 kHz inclusive. This will enable suppressing interferences within the loop to obtain a sharp output light. Also, with the multiple wavelength light source of this embodiment, the output lights thereof may have different kinds of information per wavelength, so that the output lights can be effectively utilized as detection lights of a device for a wavelength multiplexed optical communication system.

As for the types of lights having different wavelengths in "a plurality of lights having different wavelengths", while more types enable more groups of optical combs, the apparatus becomes complicated and the cost becomes high. Therefore, for the types of lights having different wavelengths, 2 types to 100 types can be mentioned, where 2 types to 10 types are preferable, and 3 types to 5 types are more preferable.

"A plurality of lights having different wavelengths" may be obtained by changing the wavelength using an optical device using a single light source or a plurality of light sources having different wavelengths may be used. A preferred embodiment of a light source is one that outputs pseudorandom signals. For the pseudo random signals, those described in Japanese Patent Application Laid-Open Publication No. 5-45250, Japanese Patent Application Laid-Open Publication No. 7-218353, and Japanese Patent Application Laid-Open Publication No. 2003-50410 may be used. By using the pseudorandom signals, signals having various characteristics can be generated. Therefore, the multiple wavelength light source using the pseudorandom signal as the light source can be preferably used specifically for testing a device used for an optical communication such as a wavelength multiplexed system. Another preferred embodiment of the light source is one that outputs an optical signal arranged with periodicity. For an optical signal arranged with periodicity, a pulse signal can be mentioned.

2. Wavelength Multiplexed Optical Communication System

A wavelength multiplexed optical communication system of the present invention is a system including the above-mentioned multiple wavelength light source of the present invention. Namely, the wavelength multiplexed optical communication system of the present invention can adopt an arrangement of a publicly known wavelength multiplexed optical communication system except that the above-mentioned multiple wavelength light source of the present invention is used as as the light source.

3. Millimeter Wave Communication System

A millimeter wave communication system of the present invention is a system including the above-mentioned multiple wavelength light source of the present invention. Specifically, one that includes the multiple wavelength light source of the present invention, a photodetector (PD), and an antenna can be mentioned. A photodetector (PD) is an apparatus for detecting a light from the multiple wavelength light source to be converted into an electric signal. Also, an antenna is an apparatus for emitting the electric signal converted by the photodetector (PD).

4. Operation Example

Figure 2A:
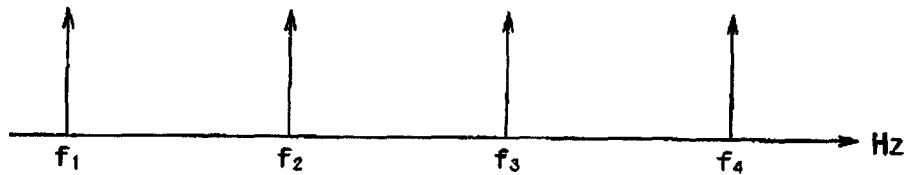
FIG. 2A shows a state where the first light is inputted.
Figure 2B:
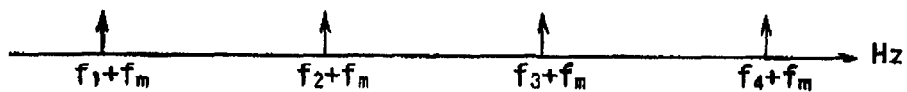
FIG. 2B shows a state of an output light of an optical SSB modulator.
Figure 2C:
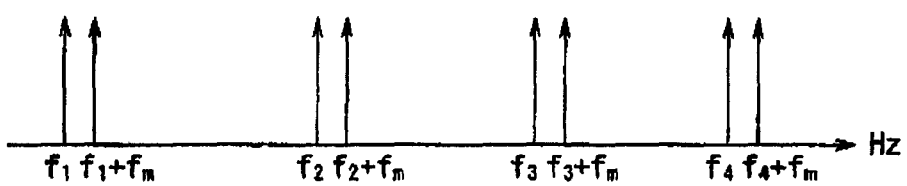
FIG. 2C shows a state where an SSB modulated light and a new light are combined.
Figure 2D:
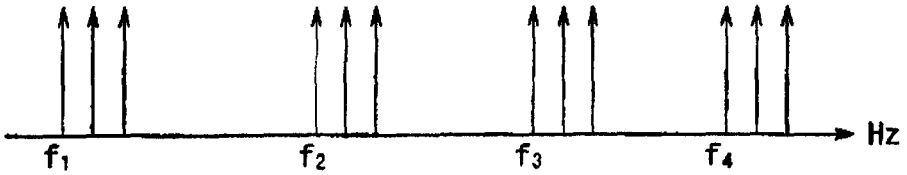
FIG. 2D shows a wave combined state of the third round.
Figure 2E:
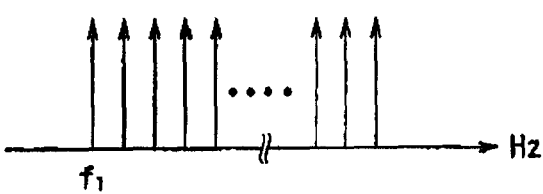
FIG. 2E is a schematic diagram of an optical comb derived from an input light $f_1$.

Hereinafter, an operation example of the multiple wavelength light source of the present invention will be described. FIG. 2 is a schematic diagram showing a state of light in each process. FIG. 2A shows a state where the first light is inputted. FIG. 2B shows a state of an output light of an optical SSB modulator. FIG. 2C shows a state where an SSB modulated light and a new light are combined, FIG. 2D shows a wave combined state of the third round. FIG. 2E is a schematic diagram of a light comb derived from the input light $f_1$. Firstly, the optical adjusting portion adjust a plurality of lights (expressed as $f_1$, $f_2$, $f_3$, and $f_4$) having different wavelengths (therefore having different frequencies). The plurality of lights having different wavelengths enters the optical input port (103) (FIG. 2A). The plurality of lights enters the optical SSB modulator (191) through the optical fiber loop (105). Then, the optical SSB modulator outputs optical single sideband signals ($f_1+f_m$, $f_2+f_m$, $f_3+f_m$, and $f_4+f_m$) having shifted from the frequency of the input light by the frequency of the modulating signal (FIG. 2B). The optical amplifier (102) increases the optical intensities of the output lights of the optical SSB modulator to compensate the optical intensities weakened by the optical modulation. The output lights from the optical amplifier reach the optical input port (103) through the optical fiber loop (105). The output lights ($f_1+f_m$, $f_2+f_m$, $f_3+f_m$, and $f_4+f_m$) from the optical modulator (102) and the lights ($f_1$, $f_2$, $f_3$, and $f_4$) are combined at the optical input port (103) as ($f_1$, $f_1+f_m$; $f_2$, $f_2+f_m$; $f_3$, $f_3+f_m$; and $f_4$, $f_4+f_m$) (FIG. 2C). When these processes are repeated once more, the wavelength multiplexed lights including the third channel ($f_1$, $f_1+f_m$, $f_1+f_m+2f_m$; $f_2$, $f_2+f_m$, $f_2+f_m+2f_m$; $f_3$, $f_3+f_m$, $f_3+f_m+2f_m$; and $f_4$, $f_4+f_m$, $f_4+f_m+2f_m$) can be obtained (FIG. 2D). By repeating these processes, an optical comb (FIG. 2E) that is a collection of lights whose optical frequencies are sequentially shifted can be obtained. By using the wavelength multiplexed lights thus obtained, an optical multiplexed communication can be easily performed.

It is to be noted that in the above-mentioned operation example, an optical comb that is a collection of lights whose optical frequencies are sequentially shifted can be obtained in the same way as described above by shifting the phases of the four types of input lights ($f_1$, $f_2$, $f_3$, and $f_4$) to obtain the optical comb. Also, an optical comb that is a collection of lights whose optical frequencies are sequentially shifted can be obtained in the same way as described above by shifting the intensities of the four types of input lights ($f_1$, $f_2$, $f_3$, and $f_4$). Moreover, by changing the modulating frequency for every circle, an optical comb whose comb intervals are shifted can be obtained.

Also, an adjustment mechanism capable of separately controlling the respective intensities of the four types of input lights in order to achieve a desired spectrum by monitoring output light spectrums with a measuring equipment such as an optical spectrum analyzer. It is desirable that this adjustment mechanism has an arrangement enabling an automatic control based on information related to the spectrum obtained by the measuring equipment. Moreover, while only four types of input lights have been used in the above-mentioned operation example, more optical combs can be obtained by using more types of input lights.

Embodiment 1

Figure 3:
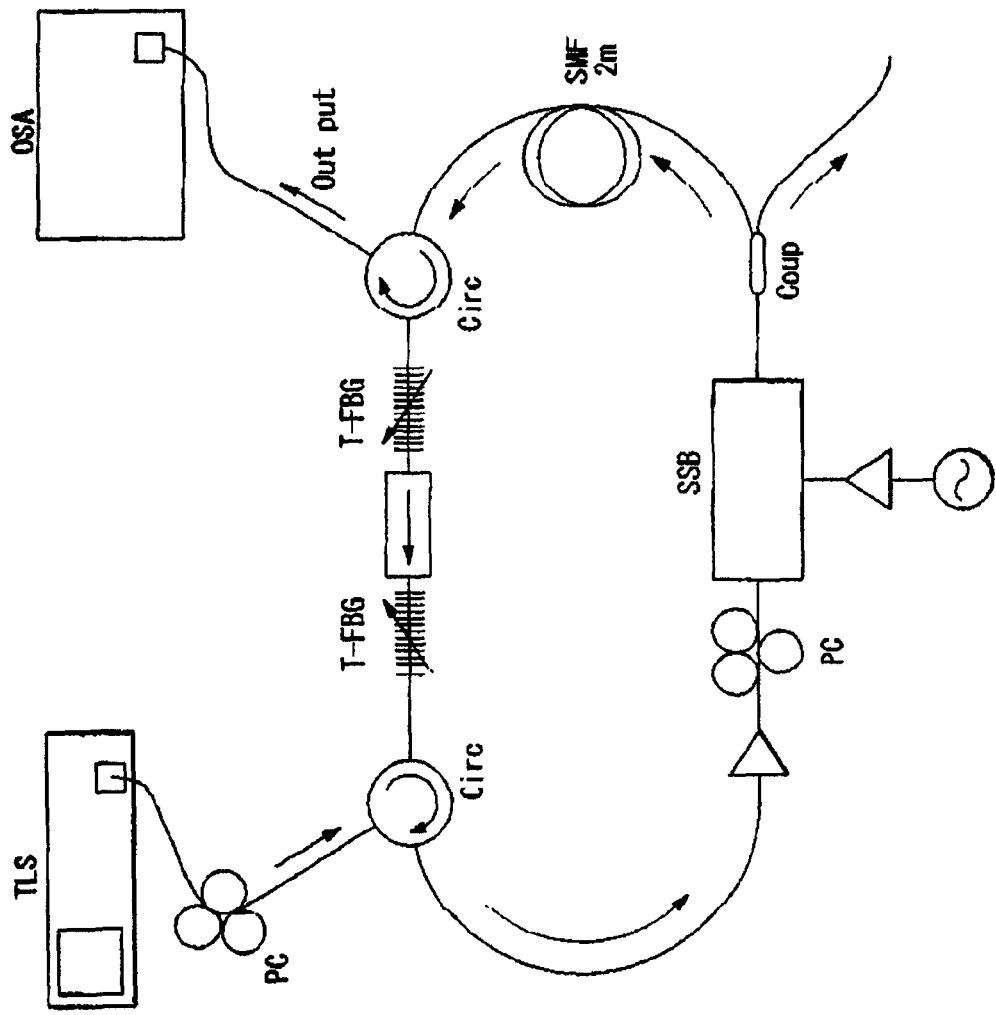
FIG. 3 is a schematic diagram of a multiple wavelength light source used in an embodiment 1.
Figure 4:
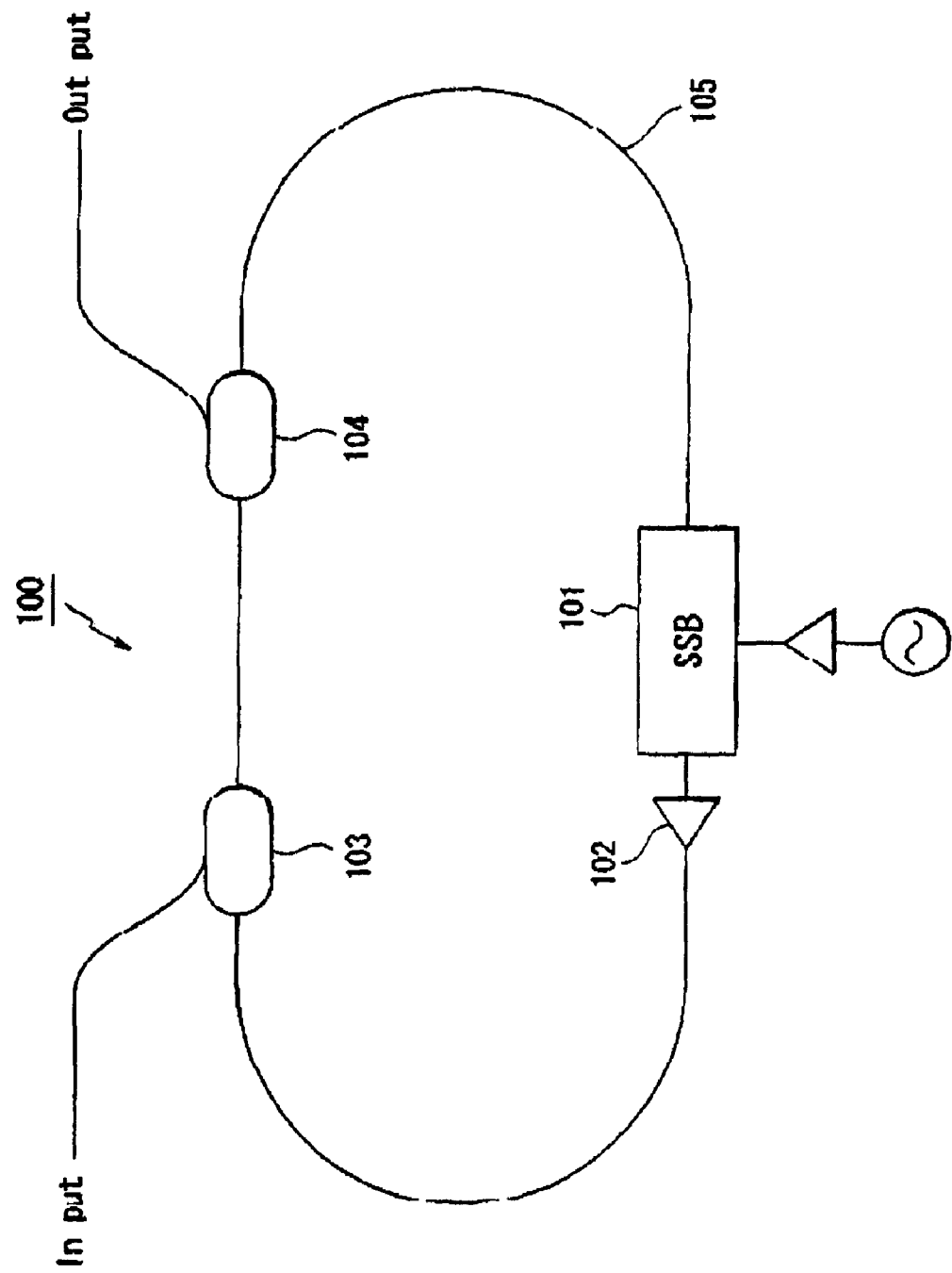
FIG. 4 is a schematic diagram showing a basic arrangement of a conventional optical comb generator.

Hereinafter, the present invention will be specifically described using embodiments. FIG. 3 is a schematic diagram of a multiple wavelength light source used in an embodiment 1. The input lights are lights whose wavelengths are 1550 nm, 1540 nm, and 1530 nm, and their respective intensities are 1 mW. Also, the frequency of the electric signal provided to the optical SSB modulator is 10 GHz. An optical amplifier using a fluoride EDF is provided within the loop to compensate a loss of light associated with the wavelength conversion at the optical SSB modulator. The wavelength interval is 0.08 nm for 10 GHz. The multiple wavelength light source shown in FIG. 3 is used to perform more than 120 circles, whereby an optical comb covering a range of approximately 10 nm for 1550 nm component of the respective input lights. It is to be noted in FIG. 3 that TLS denotes a light source that can be modulated (Tunable Laser Source). PC denotes a Polarization Controller. Circ denotes a Circulator. T-FBG denotes a fiber bragg grating whose reflecting region is variable. SSB denotes an SSB modulator. Coup denotes a Coupler. SMF denotes a single mode fiber. OSA denotes an Optical Spectrum Analyzer. By adjusting the reflecting region of the T-FBG, a light can be taken out from the optical fiber loop by specifying the number of circles, so that the number of circled processes can be controlled for a specific wavelength component.

Embodiment 2

A multiple wavelength light is obtained in the same way as in the embodiment 1 except that the phases of the three types of input lights are respectively shifted by 120° by using a phase modulator. Compared to the embodiment 1, a clearer optical comb is obtained. It is considered that this is due to a decrease of mutual interferences between input lights.

INDUSTRIAL APPLICABILITY

A multiple wavelength light source of the present invention can be used as a light source for testing an optical amplifier or the like used for an optical wavelength multiplexed optical communication. Also, the multiple wavelength light source of the present invention can be utilized as a light source of an optical wavelength multiplexed optical communication.

The invention claimed is:

1. A multiple wavelength light source comprising:
   an optical comb generator for generating a group of lights shifted from a plurality of lights inputted to the optical comb generator by predetermined frequencies; and
   an optical adjusting portion adjusting the plurality of lights having different wavelengths to be inputted to the optical comb generator;
   wherein the optical comb generator is composed of an optical fiber loop which comprises:
      an optical SSB, Single Side Band, modulator;
      an optical amplifier;
      an optical input port for inputting lights from the optical adjusting portion, and
      an optical output port for outputting lights;
      wherein the optical adjusting portion comprises:
         a plurality of light sources being capable of generating the plurality of lights; and
         a phase modulator or an intensity modulator to perform phase modulation or intensity modulation for each of the plurality of lights, the each of the plurality of lights being generated by the plurality of light sources, the modulated lights being inputted to the optical comb generator.

2. The multiple wavelength light source as claimed in claim 1, wherein the optical adjusting portion comprises a plurality of light sources generating a plurality of lights having different wavelengths.

3. The multiple wavelength light source as claimed in claim 1, wherein the optical adjusting portion comprises a light source outputting optical signals arranged with periodicity or pseudorandom signals.

4. The multiple wavelength light source as claimed in claim 1, wherein the optical adjusting portion comprises a phase modulator, an intensity modulator, or a frequency modulator respectively performing a phase modulation, an intensity modulation, or a frequency modulation per wavelength for a light inputted to the optical comb generator.

5. The multiple wavelength light source as claimed in claim 1, wherein values of frequencies modulated by the optical SSB modulator are 1 GHz-50 GHz.

6. A wavelength multiplexed optical communication system using a multiple wavelength light source as claimed in claim 1.

7. A generation method for a multiple wavelength light for generating an optical comb that is a collection of lights whose optical frequencies are sequentially shifted from a plurality of lights inputted to an optical comb generator, the method comprising repetition of:
   a step of generating the plurality of lights having different wavelengths;
   a step of modulating phase or intensity of each of the plurality of lights by means of a phase modulator or an intensity modulator, thereby performing phase modulation or intensity modulation on the plurality of lights;
   a step of inputting a plurality of lights into an optical input port;
   a step of inputting the plurality of lights into an optical SSB modulator through an optical fiber loop, the optical fiber loop comprising the optical input port, the plurality of lights being inputted into the optical input port;
   a step of outputting optical single sideband signals having shifted frequency of the plurality of lights by a frequency of a modulating signal of the optical SSB modulator;
   a step of increasing an optical intensity of the output lights of the optical SSB modulator by means of an optical amplifier;
   a step of outputting lights from the optical amplifier reaching the optical input port through the optical fiber loop; and
   a step of combining the output lights from the optical amplifier and a next plurality of lights from the optical adjusting portion being combined at the optical input port.

8. A wavelength multiplexed optical communication method using a multiple wavelength light obtained by the method for generating the multiple wavelength light as claimed in claim 7.

* * * * *